(12) United States Patent
Gotou et al.

(10) Patent No.: US 6,491,281 B1
(45) Date of Patent: Dec. 10, 2002

(54) MOLD ASSEMBLY FOR PRODUCING OPHTHALMIC LENS ARTICLE

(75) Inventors: Yuuji Gotou, Kakamigahara (JP); Yasushi Matsuda, Nagoya (JP)

(73) Assignee: Menicon Co., Ltd., Nagoya (JP)

( * ) Notice: Subject to any disclaimer, the term of this patent is extended or adjusted under 35 U.S.C. 154(b) by 224 days.

(21) Appl. No.: 09/648,292

(22) Filed: Aug. 24, 2000

(30) Foreign Application Priority Data

Aug. 27, 1999 (JP) .......................... 11-241142
Jul. 27, 2000 (JP) ........................ 2000-227446

(51) Int. Cl.[7] .............................. B29D 11/00
(52) U.S. Cl. ................. 249/114.1; 249/160; 425/215; 425/806; 425/808
(58) Field of Search ............... 249/114.1, 160; 425/215, 806, 808; 264/1.38, 2.5, 2.6, 446

(56) References Cited

U.S. PATENT DOCUMENTS

| | | | |
|---|---|---|---|
| 5,158,718 A | * | 10/1992 | Thakrar et al. ............ 264/1.32 |
| 5,326,505 A | * | 7/1994 | Adams et al. ............. 264/1.36 |
| 5,484,560 A | * | 1/1996 | Moriyama et al. ......... 264/132 |
| 5,814,257 A | * | 9/1998 | Kawata et al. ............ 264/105 |
| 5,894,002 A | | 4/1999 | Boneberger et al. |

FOREIGN PATENT DOCUMENTS

| | | |
|---|---|---|
| JP | 7-80860 | 3/1995 |
| JP | 7-195558 | 8/1995 |

* cited by examiner

*Primary Examiner*—Jan H. Silbaugh
*Assistant Examiner*—Donald Heckenberg
(74) *Attorney, Agent, or Firm*—Burr & Brown

(57) ABSTRACT

A mold assembly for forming an ophthalmic lens article includes a first mold and a second mold. The first and second molds are assembled together to define a mold cavity therebetween having a profile corresponding to that of the ophthalmic lens article to be formed. The mold cavity is filled with a polymeric material which is polymerized to form the ophthalmic lens article. At least one of the first and second molds is a resin mold which is formed from a resin material, and a portion of at least a molding surface of the resin mold is directly irradiated with UV radiation so as to provide a UV-treated surface. The ophthalmic lens article formed in the mold cavity is held on the resin mold such that the ophthalmic lens article adheres to the UV-treated surface upon separating the first and second molds away from one another.

14 Claims, 8 Drawing Sheets

MOLD ASSEMBLY FOR PRODUCING OPHTHALMIC LENS ARTICLE

This application is based on Japanese Patent Application Nos. 11-241142 filed Aug. 27, 1999, and 2000-227446 filed Jul. 27, 2000, the contents of which are incorporated hereinto by reference.

BACKGROUND OF THE INVENTION

1. Field of the Invention

The present invention relates to a mold assembly for forming an ophthalmic lens article and a method of forming the same using the mold assembly. More particularly, the present invention is concerned with such a mold assembly suitably used for forming the ophthalmic lens article including an ophthalmic lens and an intermediate product for the ophthalmic lens, and such a method for forming the ophthalmic lens article using the mold assembly.

2. Discussion of Related Art

There are known methods for producing a so-called ophthalmic lens article such as ophthalmic lenses, which include contact lenses and intraocular lenses, or an intermediate product for the ophthalmic lens, which includes a lens blank having one of opposite surfaces with a configuration which follows that of a corresponding one of front and back surfaces of the intended lens while the other surface needs to be cut to form the other of the front and back surfaces of the lens. One method used to form the above-discussed lens products includes the steps of: (a) preparing a mold assembly consisting of a first mold and a second mold in the form of a male mold and a female mold or an upper mold and a lower mold, which are closed or assembled together so as to define therebetween a mold cavity having a configuration following that of the intended ophthalmic lens article; (b) polymerizing a suitable polymeric material which fills the mold cavity defined between the first and second molds, so as to form the intended ophthalmic lens article in the mold cavity; and (c) separating the first and second molds from each other, so as to remove the ophthalmic lens article formed in the mold cavity from the mold assembly.

In the method described above, since the ophthalmic lens article in the form of a polymerized product, which is obtained by polymerization of the polymeric material in the mold cavity, adheres to one of the first and second molds, the ophthalmic lens article is held on the above-indicated one of the two molds when they are removed away from each other. It is, however, quite difficult to predict on which of the two molds the formed ophthalmic lens article will be held since there is no consistency as to which of the two molds the ophthalmic lens article will be held. Moreover, it is impossible to control the formed ophthalmic lens article to be held on and adhere to a desired one of the two molds.

Accordingly, it is conventionally required to check on which of the two molds the formed ophthalmic lens article is held when the two molds are separated away or moved apart from each other, considerably deteriorating production efficiency of the ophthalmic lens article. Since the ophthalmic lens article does not consistently remain on and adhere specifically to one of the first and second molds, it is quite difficult to automate a process of removing the formed ophthalmic lens article from the mold assembly. Accordingly, the ophthalmic lens article cannot be manufactured in an automated manner. If the intermediate product for the ophthalmic lens article adheres to either one of the two molds at one of it's the mold's opposite surfaces, it will be necessary to determine which surface needs to be processed to provide the corresponding one of the front and back surfaces of the intended ophthalmic lens article. In order to accomplish this, the intermediate product needs to be first removed from the mold, and then held and supported by a suitable holder for processing the above-indicated surface which has adhered to the mold. This undesirably deteriorates the production efficiency of the ophthalmic lens article.

In view of the above, there have been recently proposed various techniques which permit the formed ophthalmic lens article to be held on and adhered to a predetermined one of the first and second molds of the mold assembly when the first and second molds are separated away from each other.

One example of such techniques is JP-A-7-80860, which discloses a mold assembly consisting of a male mold and a female mold for forming an intermediate product for a contact lens. The male mold of the mold assembly disclosed in this publication has a protrusion or a recess formed in its molding surface having a profile following that of a back surface of the contact lens, in an attempt to improve an adhesive strength of the molding surface for holding the molded intermediate product thereon. When the intermediate product is formed by using the thus constructed mold assembly, the molded intermediate product adheres to and is held on the male mold every time when the two molds are separated away from each other. The male mold, however, inevitably has a complicated shape due to provision of the protrusion or recess on its molding surface, as compared with a male mold without such a protrusion or recess. In the mold assembly disclosed in the above publication, the shape of the male mold is undesirably limited to a specific design which permits the protrusion or recess to be formed on its molding surface, making it difficult to form the contact lens having an intended configuration. JP-A-7-195558 discloses a mold assembly consisting of a male mold and a female mold for forming a contact lens, wherein a region of a molding surface of at least one of the male and female molds is pre-treated by corona-discharging, such that the region of the molding surface interposed between a pair of electrodes is subjected to a corona discharge, for thereby improving an adhesive strength of the molding surface for holding the formed contact lens thereon. In the thus constructed mold assembly, the formed contact lens adheres to and is held on one of the male and female molds having the pre-treated molding surface every time when the male and female molds are separated away from each other.

Unlike the mold assembly disclosed in JP-A-7-80860 wherein the molding surface of the male mold is formed into a specific shape having the protrusion or recess as described above, the mold assembly of JP-A-7-195558, wherein the molding surfaces of the male and female molds do not have such a protrusion or recess, permits the ophthalmic lens article to be formed into a desired configuration.

In the mold assembly disclosed in JP-A-7-195558, however, an expensive corona-discharge device is used for pre-treating the molding surface of at least one of the male and female molds to improve the adhesive strength of the molding surface for holding the formed contact lens thereon. For effecting the pre-treatment on the molding surface of the at least one mold with high efficiency, the electrodes are shaped to follow the configuration of the mold, so that the electrodes can be positioned as close as possible to the mold. Accordingly, the arrangement disclosed in the publication undesirably pushes up the cost of manufacture of the contact lens due to the use of the expensive corona-discharge device and the specially prepared electrodes. In a series of process steps for the pre-treatment on the molding surface of the at least one mold, it is cumbersome to position the electrodes as close as possible to the mold. In addition, if the electrodes contacted the molding surface, the molding surface would be damaged. Moreover, the pre-treatment on the molding surface of the mold is effected by applying a considerably high voltage to the electrodes, causing a risk of injuring the workers who are engaged in the pre-treatment operation.

SUMMARY OF THE INVENTION

The present invention was made in the light of the background art described above. It is a first object of the present invention to provide a mold assembly consisting of a first mold and a second mold for forming an ophthalmic lens article, wherein the ophthalmic lens article formed in the mold assembly adheres to and is held on a molding surface of a predetermined one of the first and second molds with high reliability every time the two molds are separated away from each other. The molding surface of the predetermined mold is pre-treated for holding the ophthalmic lens article thereon, at a relatively reduced cost and in a safe and easy manner without a risk of damaging the molding surface, so that the intended ophthalmic lens article can be formed at a minimized cost with high production efficiency without complicating the structure of the mold assembly.

It is a second object of the invention to provide a method of forming an ophthalmic lens article having an intended configuration at a minimized cost with high production efficiency.

As a result of an extensive study by the inventors of the present invention, it has been found that the ophthalmic lens article such as a contact lens molded in the mold assembly of a resin structure adheres to the surface of the mold assembly with high stability if the surface has been irradiated directly with a UV radiation.

The above object may be achieved according to a first aspect of the present invention, which provides a mold assembly for forming an ophthalmic lens article such as an ophthalmic lens and an intermediate product for the ophthalmic lens. The mold assembly includes a first mold and a second mold, which are assembled together to define a mold cavity therebetween having a profile corresponding to that of the ophthalmic lens article. The mold cavity is filled with a polymeric material which is polymerized to form the ophthalmic lens article. At least one of the first and second molds is a resin mold which is formed of a resin material, a portion of at least a molding surface of the resin mold being irradiated directly with a UV radiation so as to provide a UV-treated surface. The ophthalmic lens article is formed in the mold cavity being held on the resin mold such that the ophthalmic lens article adheres to the UV-treated surface, when the first and second molds are separated away from each other.

In the mold assembly constructed according to the above first aspect of the present invention, a portion of at least a molding surface of one of the first and second molds, in which the mold is formed of a resin material, is irradiated directly with UV radiation so as to provide the UV-treated surface. The ophthalmic lens article formed in the mold cavity is held on the above-indicated one mold formed of the resin material (resin mold) such that the ophthalmic lens article adheres to the UV-treated surface of the resin mold every time the first and second molds are separated away from each other. In other words, in the present mold assembly, a portion of at least the molding surface of the resin mold is pre-treated by exposure to UV radiation, so as to provide the UV-treated surface to which the molded ophthalmic lens article adheres with high reliability.

In the present mold assembly, the molding surface of the resin mold is partially pre-treated for permitting the molded ophthalmic lens article to adhere to and be held on the resin mold, by using a UV-radiation emitting device which is available at a relatively low cost and safe to handle. Thus, there is no requirement to use the expensive corona-discharge device, which requires careful handling, as used in the conventional mold assembly described above. When the pre-treatment described above is effected, the UV-radiation emitting device can be located at any position provided that UV radiation is incident directly upon a desired portion of at least the molding surface of the resin mold, so that a UV lamp of the UV-radiation emitting device, for example, need not be positioned close to the resin mold. As compared with the prior art technique using the corona-discharge device, the present arrangement assures easy positioning of the UV-radiation emitting device as the pre-treating device, and protects the molding surface to be pre-treated from damage due to contact thereof with the UV lamp.

In the thus constructed mold assembly for forming the ophthalmic lens article, the molding surface of either one of the first and second molds is pre-treated for holding the molded ophthalmic lens article thereon, at a relatively low cost and in a safe and easy manner without a risk of damaging the molding surface, whereby an intended ophthalmic lens article can be formed at a minimized cost with high production efficiency.

In a preferred form of the above first aspect of the invention, only the molding surface of the resin mold is at least partially formed into the UV-treated surface. According to this arrangement, the ophthalmic lens article formed in the mold cavity adheres only to the molding surface of the resin mold when the first and second molds are separated away from each other, so that the ophthalmic lens article is held on the resin mold with high reliability.

When only the molding surface of the resin mold is formed into the UV-treated surface as described above, the molding surface of the resin mold includes an optical zone-defining region and a peripheral zone-defining region which give an optical zone and a peripheral zone of the ophthalmic lens article, respectively, and at least a portion of the peripheral zone-defining region is formed into the UV-treated surface.

According to the present arrangement, the molded ophthalmic lens article adheres to the molding surface of the resin mold only at its peripheral zone except for its optical zone, to thereby avoid possible damage to the optical zone of the ophthalmic lens article when the molded ophthalmic lens article is held on the resin mold. Accordingly, the ophthalmic lens article is capable of exhibiting intended optical characteristics.

In a preferred form of the above first aspect of the present invention, the first and second molds are both formed of a resin material, the first and second molds being assembled together to define therebetween a reservoir for storing an excess of the polymeric material which overflows the mold cavity. The reservoir is partially defined by a reservoir-defining surface of one of the first and second molds, and is different from the other mold which has a molding surface that is at least partially formed into the UV-treated surface. That is, only the reservoir-defining surface of the one mold, being at least partially formed into a UV-treated surface through direct irradiation with UV radiation, is partially formed into the UV-treated surface. Accordingly, excess polymerized product formed by polymerization of the excess polymeric material in the reservoir is held on the one mold such that the excess polymerized product adheres to the UV-treated surface of the one mold, when the first and second molds are separated away from each other.

According to this arrangement, when the first and second molds are separated away from each other, the ophthalmic lens article formed in the mold cavity adheres to and is held on the above-indicated other mold whose molding surface is at least partially formed into the UV-treated surface, while the excess polymerized product (excess polymer) formed by polymerization of the excess polymeric material in the reservoir adheres to and is held on the above-indicated one mold whose reservoir-defining surface is at least partially formed into the UV-treated surface. In this arrangement, the intended ophthalmic lens article and the excess polymerized product to be discarded is held on one and the other of the first and second molds, respectively, without an additional step of separating the ophthalmic lens article and the excess polymerized product from each other, resulting in improved production efficiency of the intended ophthalmic lens article.

In a preferred form of the above first aspect of the present invention, the first and second molds are irradiated with UV radiation with a portion of at least one of the first and second molds being covered with a shielding member which shields the portion from UV radiation, so that the other portion of the at least one of the first and second molds, which is not covered with the shielding member, is exposed to UV radiation, to thereby provide the UV-treated surface In the present arrangement, the desired portion of the mold can be formed into the UV-treated surface in a considerably simplified and economical manner, without a troublesome and costly step of preparing electrodes having special configurations following those of the molds to be pre-treated, as in the conventional technique using the corona-discharge device. By using the present mold assembly described above, the intended ophthalmic lens article can be formed at a reduced cost with improved production efficiency.

In a preferred form of the above first aspect of the present invention, one of the first and second molds, on which the ophthalmic lens article is held such that the ophthalmic lens article adheres to the UV-treated surface, is a male mold while the other of the first and second molds is a female mold.

According to this arrangement, the formed ophthalmic lens article adheres to and is held on the male mold, so that the ophthalmic lens article can be easily removed from the UV-treated surface without being damaged, by simply collapsing the male mold.

In a preferred form of the above first aspect of the present invention, the UV-treated surface has been irradiated directly with UV radiation using an excimer lamp. This arrangement permits the UV-treated surface to exhibit a significantly enhanced adhesive strength for holding the ophthalmic lens article thereon.

In a preferred form of the above first aspect of the present invention, the UV-treated surface has been irradiated directly with UV-radiation having a wavelength within a range of 170~260 nm. Since UV radiation having a wavelength exceeding 260 nm has a low degree of photon energy, the UV-treated surface which has been irradiated with UV radiation whose wavelength exceeds 260 nm does not exhibit a sufficiently high adhesive strength for holding the ophthalmic lens article thereon. UV radiation whose wavelength is less than 170 nm tends to be absorbed in the atmosphere, increasing an attenuation factor of the irradiance of UV radiation with respect to a distance from the light source in the form of the UV lamp of the UV-radiation emitting device. To avoid this, the light source needs to be positioned as close as possible to the portion of the mold assembly to be treated with UV radiation. Alternatively, UV radiation needs to be applied to the above-indicated portion of the mold assembly such that the light source (UV-radiation emitting device) and the mold assembly are placed in vacuum by using a suitable vacuum device. In either case, there may arise problems of deteriorated production efficiency and increased cost of manufacture of the ophthalmic lens article. Accordingly, if the above-indicated portion of the mold assembly is irradiated with UV radiation having a wavelength of 170~260 nm, the portion of the mold assembly can be formed, in a simplified and economical manner, into the U-treated surface which exhibits significantly enhanced adhesive strength for holding the ophthalmic lens article thereon.

In a preferred form of the above first aspect of the invention, the UV-treated surface has been treated with UV radiation at a radiation energy of 0.1~5.5 mJ/cm$^2$.

If UV radiation energy per unit area is less than 0.1 mJ/cm$^2$, the UV-treated surface does not exhibit a sufficiently high adhesive strength for holding the ophthalmic lens article thereon. On the contrary, if UV radiation energy exceeds 5.5 mJ/cm$^2$, the adhesive strength exhibited by the UV-treated surface is excessively large depending upon the wavelength of UV radiation applied thereto. In this case, it requires a special device or instrument for removing the ophthalmic lens article from the UV-treated surface, undesirably deteriorating the production efficiency and inevitably increasing the cost of manufacture of the ophthalmic lens article. Further, the ophthalmic lens article may receive an unexpected external force due to the use of the device or instrument upon removal from the UV-treated surface, undesirably causing a risk of damaging the ophthalmic lens article. In view of the above, if the UV-treated surface has been treated with UV radiation at a radiation energy of 0.1~5.5 mJ/cm$^2$, the UV-treated surface exhibits a sufficiently high adhesive strength for holding the ophthalmic lens article thereon without requiring a troublesome and costly process of removing the ophthalmic lens article from the UV-treated surface.

The above-indicated second object of the present invention may be attained according to a second aspect of the invention, which provides a method of forming an ophthalmic lens article such as an ophthalmic lens and an intermediate product for the ophthalmic lens, by using the mold assembly as defined in the above first aspect of the invention. The method includes assembling the first and second molds together to thereby define the mold cavity therebetween, at least one of the first and second molds being the resin mold, and a portion of at least the molding surface of the resin mold being irradiated directly with UV radiation so as to provide the UV-treated surface; polymerizing the polymeric material filled in the mold cavity, to provide a polymer that gives the ophthalmic lens article; separating the first and second molds away from each other; and removing the ophthalmic lens article from the resin mold while the ophthalmic lens article is held on the resin mold such that the ophthalmic lens article adheres to the UV-treated surface of the resin mold.

In the method described above, the ophthalmic lens article is molded by using the mold assembly consisting of the first and second molds, one of which is a resin mold in which at least its molding surface is irradiated directly with UV radiation so as to provide the UV-treated surface. The molded ophthalmic lens article is held on the resin mold such that the ophthalmic lens article adheres to the UV-treated surface when the first and second molds are separated away from each other. Thereafter, the ophthalmic lens article adhering to the UV-treated surface is removed therefrom. According to this method, the formed ophthalmic lens article is held on the resin mold every time the first and second molds are separated away from each other, resulting in enhanced production efficiency of the ophthalmic lens article. In the present method, the portion of at least the molding surface of the resin mold is irradiated directly with UV radiation so as to provide the UV-treated surface for holding the formed ophthalmic lens article thereon. Thus, the present method permits the UV-treated molding surface to be economically formed in the molding surface in a simplified and safe manner without a risk of damaging the molding surface, as compared with the conventional method wherein the corona-discharge device is used to treat the molding surface. Further, the molding surfaces of the first and second molds of the mold assembly used in the present method need not have special surface configurations which enable the ophthalmic lens article to be held thereon, assuring a high degree of freedom in the configuration of the ophthalmic lens article formed between the molding surfaces. Thus, the present method permits the manufacture of the ophthalmic lens article having a desired configuration at a minimized cost with high efficiency.

In a preferred form of the above second aspect of the present invention, the step of removing the ophthalmic lens article held on the resin mold is effected by collapsing the resin mold radially inwardly, so that the ophthalmic lens article is removed from the UV-treated surface of the resin mold. This arrangement permits easy, quick, and economical removal of the ophthalmic lens article from the UV-treated surface without using a special device or instrument.

In a preferred form of the above second aspect of the present invention, the step of removing the ophthalmic lens article held on the resin mold is effected by immersing the ophthalmic lens article together with the resin mold in water for hydration, so that the ophthalmic lens article is removed from the V-treated surface of the resin mold. According to this arrangement, the ophthalmic lens article adhering to the UV-treated surface can be advantageously removed therefrom without being damaged due to an external force which would be otherwise applied to the ophthalmic lens article due to the use of the special device or instrument upon removal from the UV-treated surface.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE INVENTION

Figure 1:
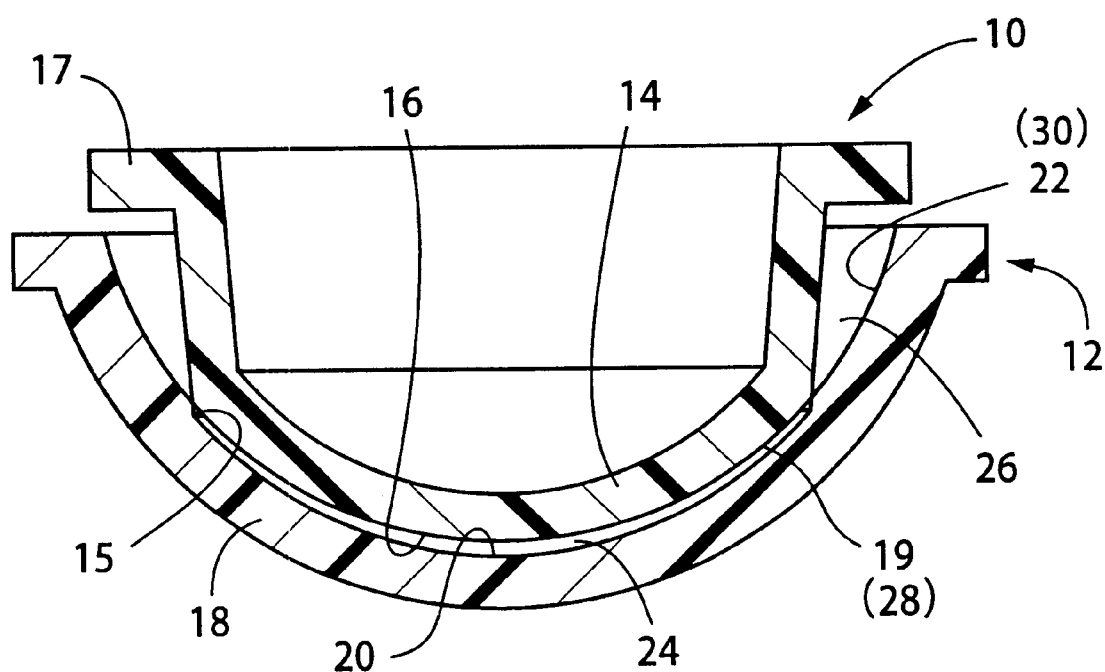
FIG. 1 is an elevational view in cross section showing a mold assembly consisting of a male mold and a female mold for forming an ophthalmic lens article, which mold assembly is constructed according to one embodiment of the present invention, the view showing the mold assembly when the male an female molds are closed together.

Referring first to FIG. 1, there is shown a mold assembly for forming an ophthalmic lens article in the form of a contact lens, which mold assembly is constructed according to one embodiment of the present invention. The mold assembly consists of a first mold in the form of a male mold 10 and a second mold in the form of a female mold 12.

Figure 2:
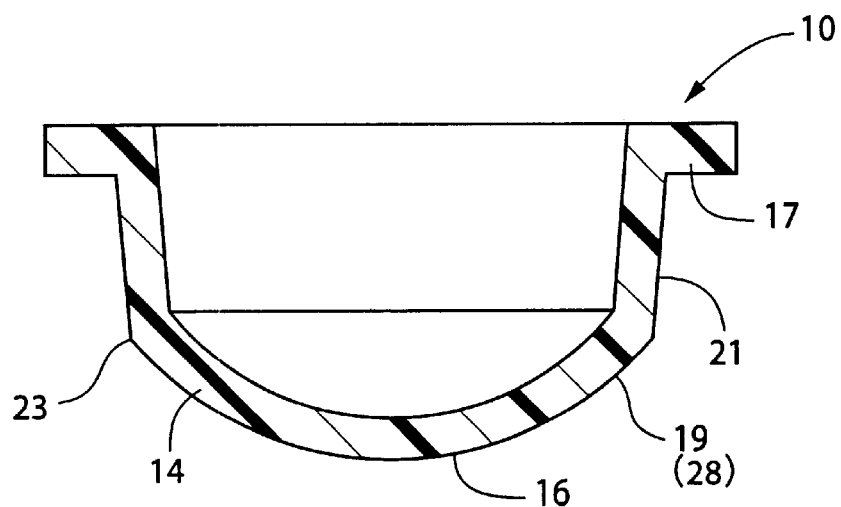
FIG. 2 is an elevational view in cross section showing the male mold of the mold assembly of FIG. 1.

The male mold 10 is a generally cup-like member, as shown in FIG. 2, and is transparent so as to permit transmission of a light therethrough. Namely, the male mold 10 includes a cylindrical portion, a downwardly protruding convex bottom portion 14 which protrudes downwardly from one of opposite ends of the cylindrical portion, and an outward flange 17 which is formed at the other end of the cylindrical portion so as to extend radially outwardly therefrom. The outer surface of the convex bottom portion 14 of the male mold 10 functions as a molding surface 16 which has a profile accurately following that of a back surface, i.e., base curved surface, of an intended contact lens.

Figure 3:
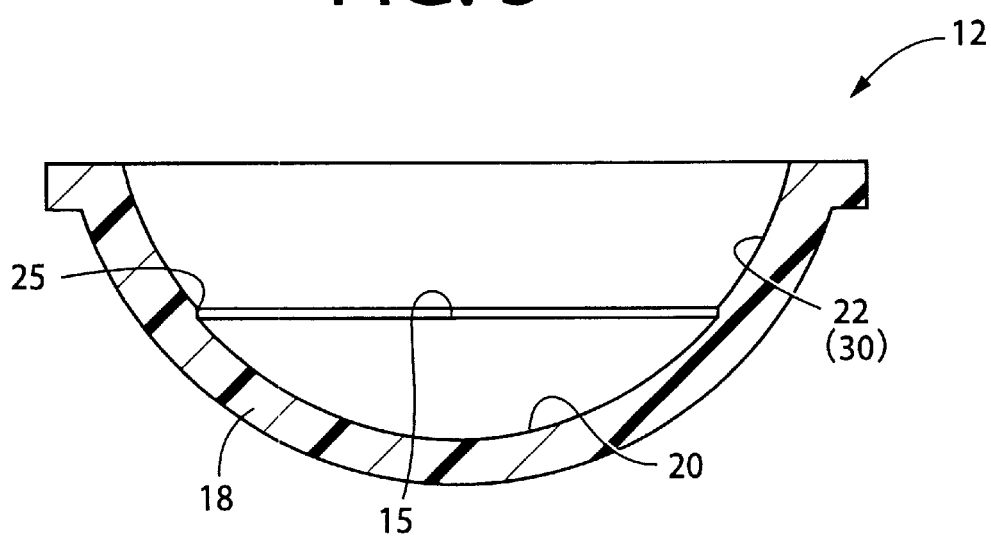
FIG. 3 is an elevational view in cross section showing the female mold of the mold assembly of FIG. 1.

The female mold 12 is a generally semi-spherical member which is open at its upper end and includes a semi-spherical portion 18, as shown in FIG. 3. The female mold 12 is transparent so as to permit transmission of a light therethrough. On the inner surface of the semi-spherical portion 18 of the female mold 12, a shoulder 15 is formed at an intermediate portion of the inner surface as seen in a direction of the depth of the semi-spherical portion 18, so that the inner surface is divided into two sections located on the opposite sides of the shoulder 15, i.e., an upper section on the side of the open end functioning as a reservoir-defining surface 22 which partially defines a reservoir 26 explained below, and a lower section on the side of the bottom portion of the semi-spherical portion 18 functioning as a molding surface 20 which has a profile accurately following that of a front surface, i.e., front curved surface, of an intended contact lens.

As shown in FIG. 1, the male and female molds 10, 12 are closed or assembled together such that a lower end 23 of an outer circumferential surface 21 of the cylindrical portion of the male mold 10 is held in abutting contact with an upper end 25 of the shoulder 15 formed on the inner surface of the semi-spherical portion 18 of the female mold 12. When the male and female molds 10, 12 are assembled together as described above, the molding surface 16 of the male mold 10 and the molding surface 20 of the female mold 12 cooperate with each other to define, on the lower side of the abutting portion of the male and female molds 10, 12, a mold cavity 24 which has a configuration following that of the intended contact lens and which is filled with a polymeric material in the form of a monomer which is polymerized to give the intended contact lens. The outer circumferential surface 21 of the cylindrical portion of the male mold 10 and the reservoir-defining surface 22 of the female mold 12 cooperate with each other to define, on the upper side of the abutting portion of the two molds 10, 12, the reservoir 26 for storing an excess polymeric material which overflows the mold cavity 24.

Figure 4:
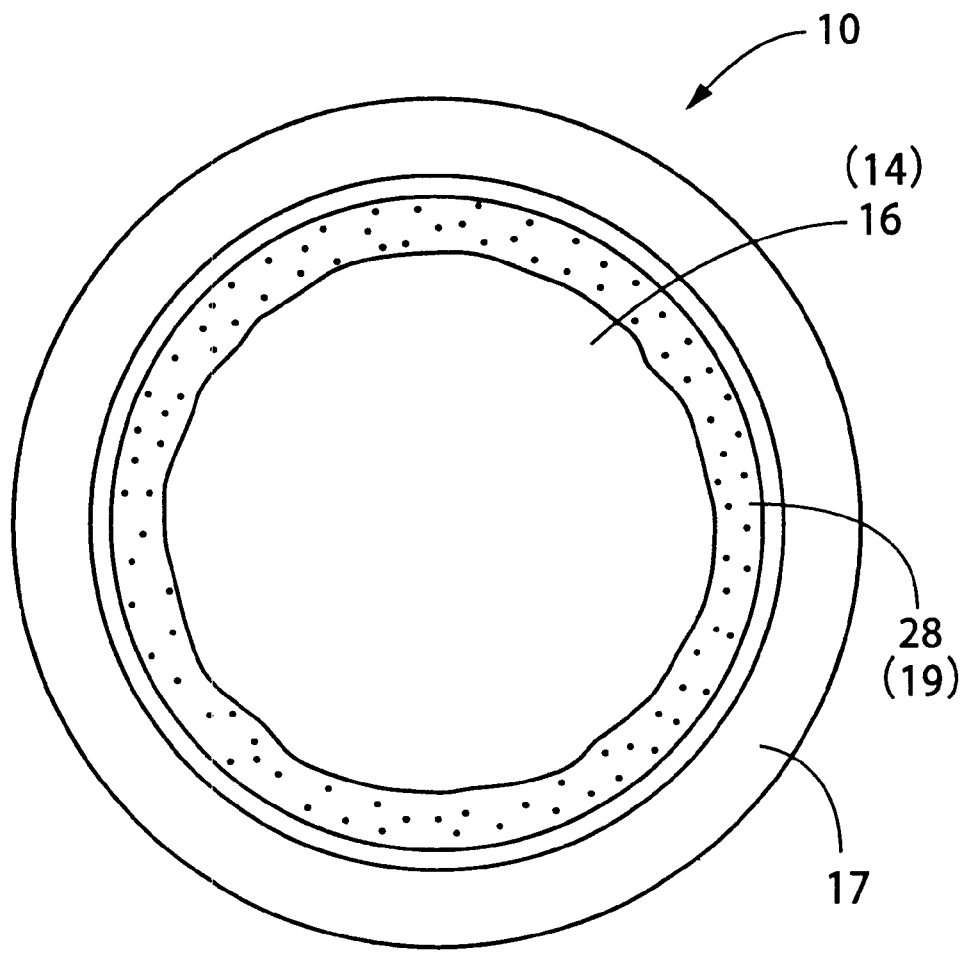
FIG. 4 is a bottom plan view of the male mold of the mold assembly of FIG. 1.
Figure 5:
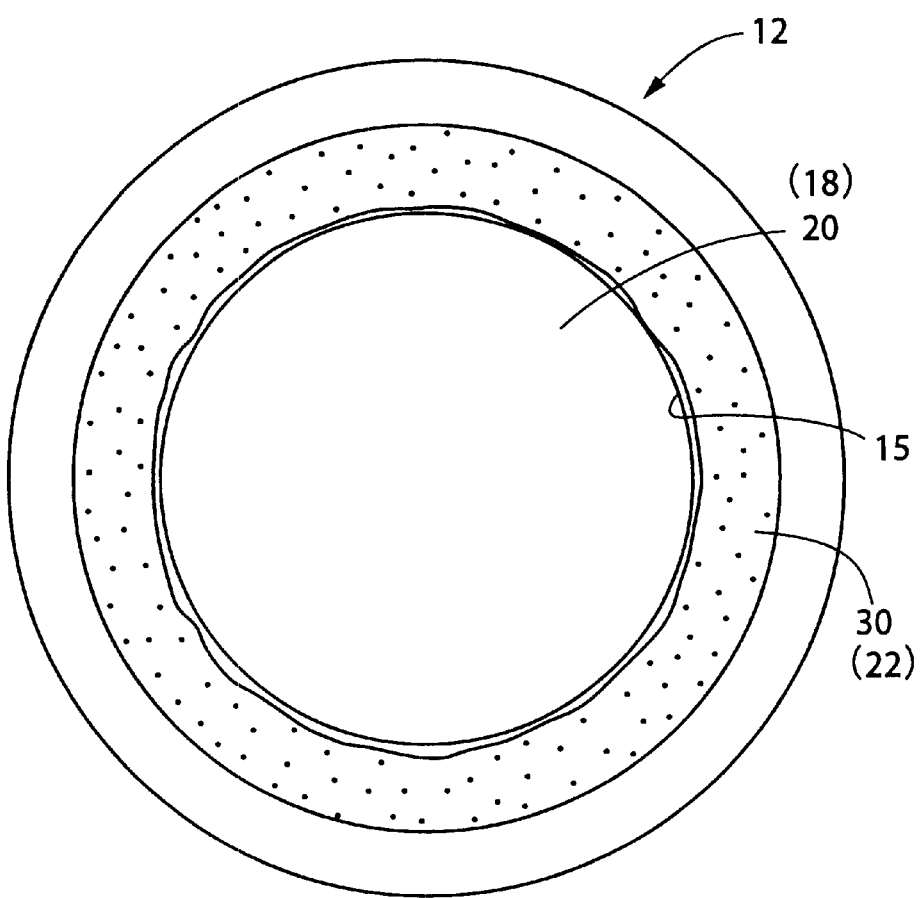
FIG. 5 is a plan view of the female mold of the mold assembly of FIG. 1.

Each of the male and female molds 10, 12 in the present embodiment is a resin mold formed of polypropylene. In the resin-formed male mold 10, an annular region which is located radially outwardly of the molding surface 16 and functions as a peripheral zone-defining surface 19 of the molding surface 16, which surface 19 gives a peripheral zone except for an optical zone in a back surface of the intended contact lens, is irradiated directly with a UV radiation so as to provide a UV-treated surface 28, as shown in FIG. 4. This UV-treated surface 28 exhibits a significantly enhanced adhesive strength for holding thereon a polymerized product formed by polymerization of the polymeric material in the mold cavity 24 for giving the intended contact lens. In the resin-formed female mold 12, the entirety of the reservoir-defining surface 22 is irradiated with a UV radiation so as to provide a UV-treated surface 30, as shown in FIG. 5. The UV-treated surface 30 exhibits a significantly enhanced adhesive strength for holding, thereon, an excess polymerized product 36 (FIG. 8) formed by polymerization of the polymeric material 32 in the reservoir 26. In FIGS. 4 and 5, though the UV-treated surfaces 28, 30 of the male and female molds 10, 12 are dotted for easier understanding, it is noted that the appearance of these UV-treated surfaces 28, 30 does not differ from that of the other portions of the two molds 10, 12, which portions are not treated with UV radiation.

In the present embodiment, the peripheral zone-defining surface 19 of molding surface 16 of the male mold 10 and the entirety of the reservoir-defining surface 22 of the female mold 12 are formed into the respective UV-treated surfaces 28, 30 in the following manner. As a shielding member which inhibits transmission of UV radiation therethrough by reflecting UV radiation, a PET film which is coated with a UV-shielding material is used. As a UV radiation emitting device, a dielectric barrier discharge excimer lamp which is filled with a Xe gas is used. With the entire surface of the male mold 10, except for the peripheral zone-defining surface 19 of the molding surface 16, and the entire surface of the female mold 12, except for the reservoir-defining surface 22, being covered with the above-described UV-shielding PET film, the male and female molds 10, 12 are irradiated with UV radiation emitted from the dielectric barrier discharge excimer lamp. The peripheral zone-defining surface 19 of the molding surface 16 of the male mold 10 and the reservoir-defining surface 22 of the female mold 12, which are not covered with the UV-shielding PET film, are irradiated directly with UV radiation, for thereby providing, in an easy and economical manner, the UV-treated surface 28, 30. The UV-treated surface exhibits effectively enhanced adhesive strength for holding thereon the polymerized product that gives the intended contact lens and the excess polymerized product 36, respectively. In the present embodiment, the Xe gas-filled dielectric barrier discharge excimer lamp, which is known as a UV-radiation emitting device for emitting UV radiation having a wavelength within a relatively narrow range, whose center is 172 nm, is used for applying UV radiation to the predetermined portions of the male and female molds 10, 12 which are not covered with the UV-shielding PET film. The predetermined portions, i.e., the peripheral zone-defining surface 19 of the male mold 10 and the reservoir-defining surface 22 of the female mold 12, are irradiated directly with UV radiation to thereby provide the UV-treated surfaces 28, 30, respectively.

The wavelength of UV radiation applied to the predetermined portions of the male and female molds 10, 12, which are formed into the UV-treated surfaces 28, 30, is not particularly limited, but is preferably in a range of 170~260 nm. UV radiation having a wavelength that exceeds 260 nm has a low degree of photon energy, and undesirably may generate ozone in the atmosphere and deteriorate the efficiency of breaking the molecular bonds of the resin material at those predetermined portions of the male and female molds 10, 12. In this case, the UV-treated surfaces 28, 30 do not exhibit a sufficiently high adhesive strength for holding thereon the contact lens as the polymerized product formed in the mold cavity 24 and the excess polymerized product 36 formed in the reservoir 26, respectively. When UV radiation having a wavelength below 170 nm is applied to the predetermined portions of the male and female molds 10, 12, the amount of UV radiation adsorbed in the atmosphere tends to be large, increasing the attenuation factor of the irradiance of UV radiation with respect to the distance between the predetermined portions of the male and female molds 10, 12 which are formed into the UV-treated surfaces 28, 30, and the excimer lamp. To avoid this, the excimer lamp needs to be located as close as possible to those predetermined portions of the male and female molds 10, 12. Alternatively, the male and female molds 10, 12 and the excimer lamp need to be placed in a vacuum state by using a vacuum device. Either case will deteriorate the operating efficiency and push up the required cost in the process of forming the UV-treated surfaces 28, 30.

In the present embodiment wherein the excimer lamp, which emits UV radiation having a principal or dominant wavelength of 172 nm, is used to form the peripheral zone-defining surface 19 of the molding surface 16 of the male mold 10 and the reservoir-defining surface 22 of the female mold 12 into the UV-treated surfaces 28, 30, respectively, the UV-treated surfaces 28, 30 exhibit a sufficiently high adhesive strength for holding, thereon, the contact lens as the polymerized product formed in the mold cavity 24 and the excess polymerized product 36 formed in the reservoir 26, respectively. Further, the present arrangement eliminates additional steps of locating the excimer lamp as close as possible to the peripheral zone-defining surface 19 and the reservoir-defining surface 22 and preparing the vacuum device, so that these surfaces 19, 22 can be formed into the w-treated surfaces 28, 30, respectively, in an easy and economical manner.

In the process of forming the UV-treated surfaces 28, 30, the Xe gas-filled dielectric barrier discharge excimer lamp as used in the present arrangement need not be used. Other known UV-radiation emitting devices may be suitably used by considering the wavelength of UV radiation, the cost, etc., for example, a dielectric barrier discharge excimer lamp filled with a discharge gas other than the Xe gas and a UV lamp having a structure different from that of the excimer lamp. Further, other UV-shielding members for shielding the transmission of UV radiation therethrough such as a metal including iron or aluminum may be used in place of the UV-shielding PET film as used in the present embodiment. When the male and female molds 10, 12 are partially treated with UV radiation by using the UV-shielding member described above, the window of the UV-radiation emitting device from which the UV radiation is emitted is covered with the UV-shielding member except for a predetermined region thereof, so as to reduce the area of the window from which UV radiation is emitted. Accordingly, the male and female molds 10, 12 are irradiated, at limited portions thereof which are formed into the UV-treated surfaces, with UV radiation emitted from the above-indicated predetermined region of the window of the UV-radiation emitting device. Alternatively, the entirety of the male and female molds 10, 12 are irradiated with UV radiation with the male and female molds 10, 12 being covered with the UV-shielding member except for the predetermined portions to be treated with UV radiation, so that the predetermined portions which are not covered with the UV-shielding member are treated with UV radiation.

In the present embodiment, the predetermined portions of the male and female molds 10, 12 are irradiated with UV radiation at a radiation energy which is suitably determined depending upon a desired degree of the adhesive strength to be exhibited by the UV-treated surface 28, 30. It is preferable that UV radiation energy per unit area be held in a range of 0.1~5.5 mJ/cm$^2$. The UV radiation energy per unit area which acts on the predetermined portions of the male and female molds 10, 12 below 0.1 mJ/cm$^2$ is insufficient to break the molecular bonds of the resin material at those predetermined portions of the male and female molds 10, 12. In this case, the UV-treated surfaces 28, 30 which have been treated with UV radiation do not exhibit a sufficiently high adhesive strength for holding thereon the polymerized product giving the intended contact lens and the excess polymerized product 36, respectively. On the contrary, if UV radiation energy exceeds 5.5 mJ/cm$^2$, the adhesive strength exhibited by the w-treated surfaces 28, 30 is excessively large depending upon the wavelength of UV radiation applied thereto. In this case, it is necessary to use a special device or instrument to remove the molded contact lens from the UV-treated surface 28, undesirably deteriorating the production efficiency and inevitably increasing the cost of manufacture of the contact lens. Further, the contact lens may receive an unexpected external force due to the use of the device or instrument for removal thereof from the UV-treated surface 28, causing a risk of damaging the contact lens.

In the present embodiment, the peripheral zone-defining surface 19 of the molding surface 16 of the male mold 10 and the reservoir-defining surface 22 of the female mold 12 are treated with UV radiation. However, the UV-treated portions are not limited to those portions described above. For instance, only a portion of the peripheral zone-defining surface 19, the entirety of the molding surface 16, or only a portion of the reservoir-defining surface 22 may be treated with UV radiation as described above. Alternatively, only the male mold 10 may be treated with UV radiation at a portion of at least the molding surface 16. On the contrary, only the female mold 12 may be treated with UV radiation at a portion of at least the molding surface 20. In essence, a desired one of the male and female molds 10, 12 is treated with UV radiation for increasing the adhesive strength for holding, thereon, the polymerized product (the intended ophthalmic lens article) formed in the mold cavity 24 or the excess polymerized product 36 formed in the reservoir 26.

Figure 8:
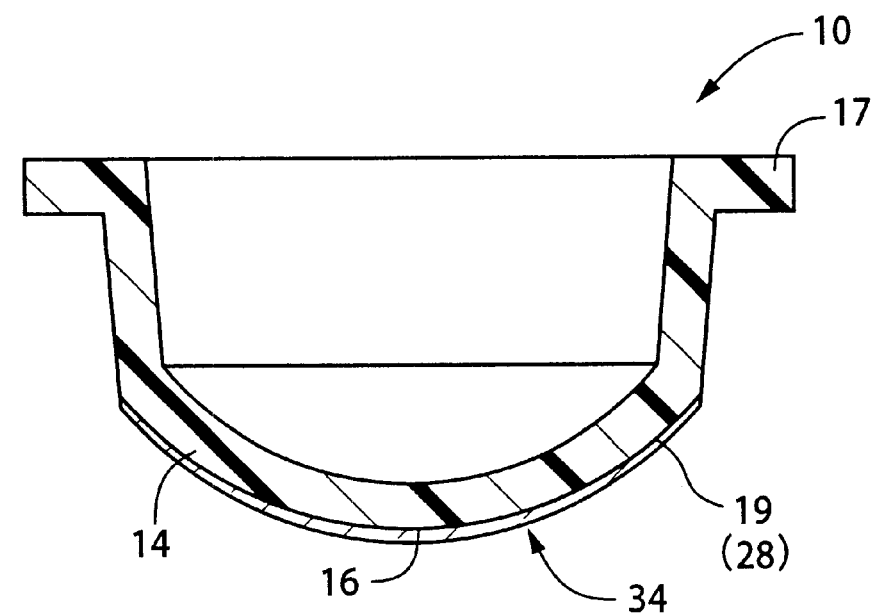
FIG. 8 is a view showing still another process step of forming a contact lens using the mold assembly of FIG. 1, wherein a molded contact lens remains on and adheres to the male mold when the male and female molds are separated away from each other.
Figure 8:
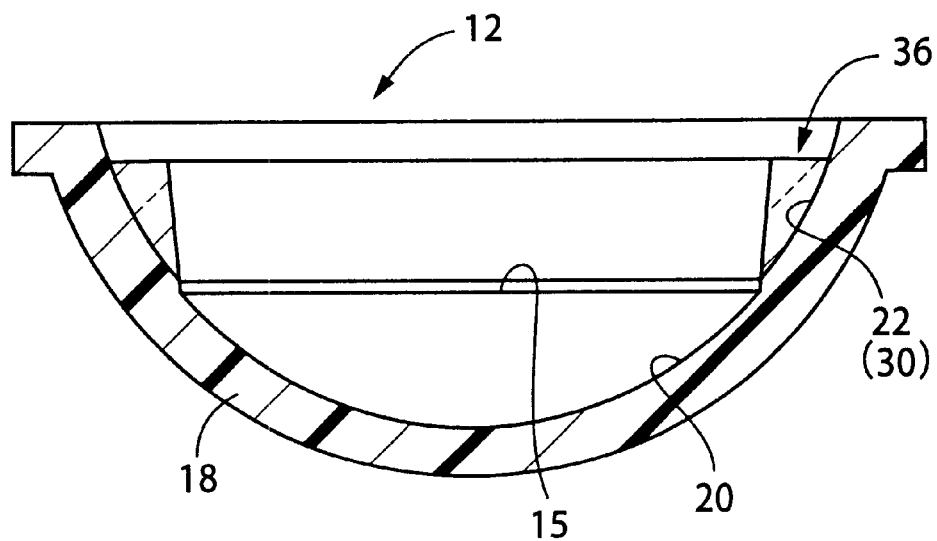

In the mold assembly constructed according to the present embodiment the peripheral zone-defining surface 19 of the molding surface 16 of the male mold 10 and the entirety of the reservoir-defining surface 22 of the female mold 12 are exposed directly to UV radiation, so as to provide the UV-treated surfaces 28, 30, respectively, which exhibit effectively increased adhesive strength for holding thereon the contact lens 34 as the polymerized product formed in the mold cavity 24 and the excess polymerized product 36 formed in the reservoir 26, respectively. Accordingly, when the male and female molds 10, 12 are separated away from each other, the contact lens 34 formed in the mold cavity 24 is held on the male mold 10 such that the contact lens 34 adheres at its peripheral zone, except for its optical zone, to the UV-treated surface 28 corresponding to the peripheral zone-defining surface 19 of the molding surface 16 of the male mold 10. The excess polymerized product 36 formed in the reservoir 26 is held on the female mold 12 such that excess polymerized product 36 adheres to the UV-treated surface 30 corresponding to the reservoir-defining surface 22 of the female mold 12, as shown in FIG. 8.

Referring next to FIGS. 6–9, there will be explained a method of producing an intended ophthalmic lens article in the form of a contact lens, by using the mold assembly constructed as described above.

Figure 6:
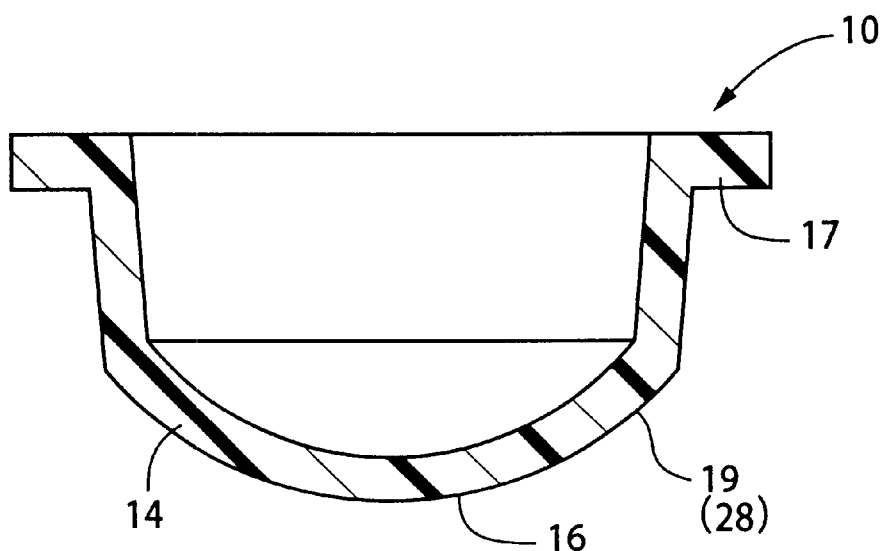
FIG. 6 is a view showing one process step of forming a contact lens using the mold assembly of FIG. 1, before the male mold is assembled with the female mold in which a polymeric material is accommodated.
Figure 6:
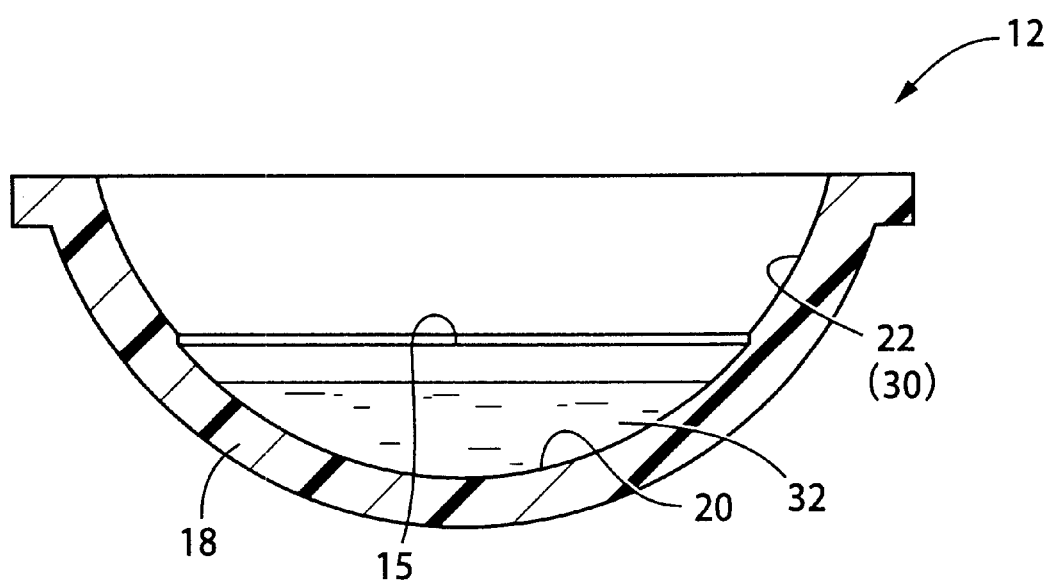

As shown in FIG. 6, a predetermined amount of a polymeric material 32 which gives by polymerization a polymer that constitutes the intended ophthalmic lens article in the form of the contact lens 34 is introduced into the semi-spherical portion 18 of the female mold 12 from a suitable supplying device not shown. Subsequently, the male mold 10 and the female mold 12 are assembled together such that the lower end 23 of the cylindrical portion of the male mold 10 is held in abutting contact with the upper end 25 of the shoulder 15 of the female mold 12, for thereby defining the mold cavity 24 between the two molds 10, 12, as shown in FIG. 1, which mold cavity 24 is filled with the polymeric material 32. The polymeric material 32 which overflows the mold cavity 24 upon assembling the two molds 10, 12 is stored in the reservoir 26 which is defined by the outer circumferential surface 21 of the cylindrical portion of the male mold 10 (i.e., the reservoir-defining surface 21 of the male mold 10) and the reservoir-defining surface 22 of the female mold 12. The polymeric material 32 is a known liquid monomer composition which gives a polymer that constitutes the intended contact lens.

Figure 7:
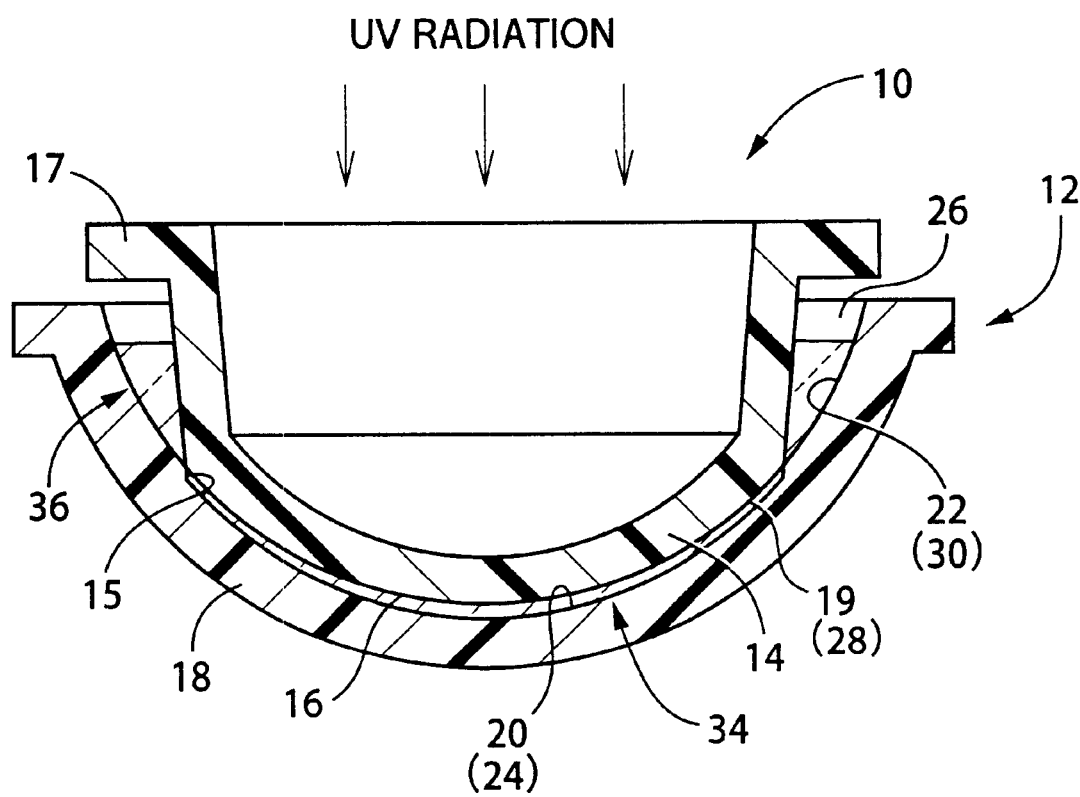
FIG. 7 is a view showing another process step of forming a contact lens using the mold assembly of FIG. 1, wherein a desired contact lens is formed in the mold cavity defined between the male and female molds in the closed state.

With the mold cavity 24 being filled with the polymeric material 32, the polymeric material 32 is polymerized by an ordinary photopolymerization method using UV radiation emitted from a suitable light source, or a thermal polymerization method using heat supplied from a suitable heat source, so as to form the intended contact lens in the mold cavity 24. In the present embodiment, the polymeric material 32 in the mold cavity 24 is photopolymerized by exposure to UV radiation which reaches the mold cavity 24 through the male mold 10 formed of the transparent material which permits transmission of UV radiation therethrough, as shown in FIG. 7. By photopolymerization of the polymeric material 32 in the mold cavity 24, there is formed the intended contact lens 34 having a back surface whose profile follows that of the molding surface 16 of the male mold 10 and a front surface whose profile follows that of the molding surface 20 of the female mold 12. The excess polymeric material 32 stored in the reservoir 26 is also photopolymerized by exposure to UV radiation which reaches the reservoir 26 through the male mold 10, so that the excess polymerized product 36 is formed in the reservoir 26. As mentioned above, the molded contact lens 34 adheres at its peripheral zone except for its optical zone to the UV-treated surface 28 of the molding surface 16 of the male mold 10, while the excess polymerized product 36 adheres to the UV-treated surface 30 corresponding to the reservoir-defining surface 22 of the female mold 12.

Subsequently, the male mold 10 is separated by application of a sufficient force away from the female mold 12, as shown in FIG. 8. According to the present arrangement wherein the contact lens 34 formed in the mold cavity 24 adheres to the UV-treated surface 28 corresponding to the peripheral zone-defining surface 19 of the molding surface 16 of the male mold 10 and the excess polymerized product 36 formed in the reservoir 26 adheres to the UV-treated surface 30 corresponding to the reservoir-defining surface 22 of the female mold 12 as described above, the formed contact lens 34 is held on the male mold 10 while the excess polymerized product 36 is held on the female mold 12, as shown in FIG. 8, when the male and female molds 10, 12 are disassembled from each other.

Figure 9:
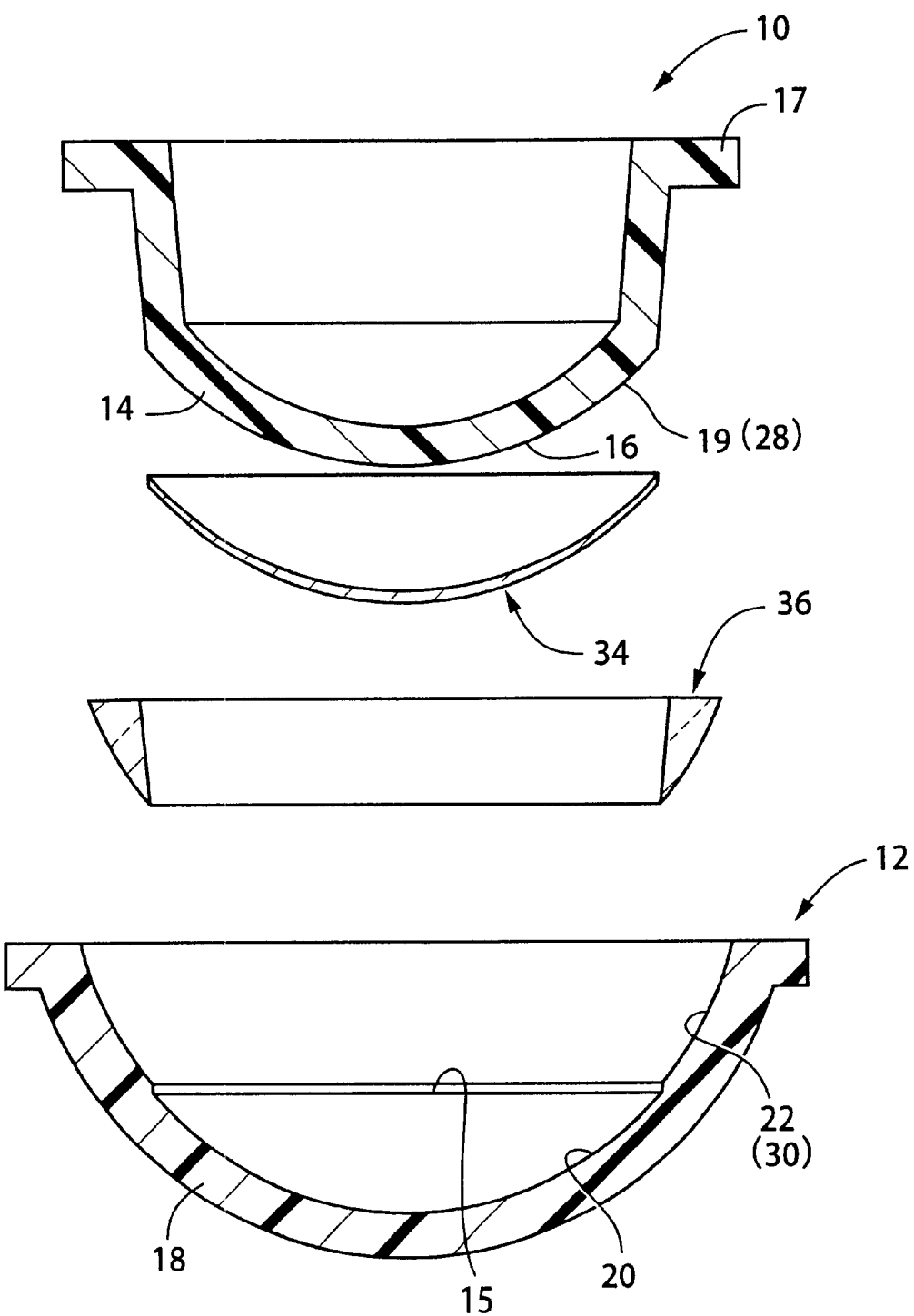
FIG. 9 is a view showing yet another process step of forming a contact lens using the mold assembly of FIG. 1, wherein the molded contact lens has been removed from the male mold.

Thereafter, the contact lens 34 is removed from the male mold 10, and the excess polymerized product 36 remaining in the semi-spherical portion 18 of the female mold 12 is removed therefrom, as shown in FIG. 9, according to a known chemical, physical, or mechanical method. When the contact lens 34 is removed from the male mold 10, the male mold 10 is deformed by collapsing, e.g., by pressing radially inwardly the cylindrical portion of the male mold 10, to thereby separate the contact lens 34 from the UV-treated surface 28 of the male mold 10. Alternatively, the male mold 10 on which the contact lens 34 is held is immersed in a suitable hydration liquid such as water, so that the contact lens 34 is impregnated with the hydration liquid. Then, the impregnated contact lens 34 is removed from the UV-treated surface 28 of the male mold 10. In the former method, the contact lens 34 can be easily, quickly and economically removed from the male mold 10 without using a special device or instrument. In the latter method, the contact lens 34 can be separated from the male mold 10 without being damaged due to an external force.

In the present embodiment, the peripheral zone-defining surface 19 of the molding surface 16 of the male mold 10 is formed into the UV-treated surface 28 which exhibits a sufficiently high bonging strength for holding the molded contact lens 34 thereon, by simply applying UV radiation directly to the peripheral zone-defining surface 19 using the excimer lamp which is available at a relatively low cost and which can be handled safely, without changing the configuration of the molding surface 16. According to the present arrangement, the molded contact lens 34 is held on the male mold 10 with high reliability such that the contact lens 34 adheres to the UV-treated surface 28 of the molding surface 16 every time when the male and female molds 10, 12 are separated away from each other, whereby the contact lens 34 can be formed at a minimized cost with excellent production efficiency.

In the present embodiment wherein the peripheral zone-defining surface 19 of the molding surface 16 of the male mold 10 and the reservoir-defining surface 22 of the female mold 12 are formed into the respective UV-treated surfaces 28, 30 by using the excimer lamp, which emits UV radiation whose principal wavelength is 172 nm, the UV-treated surfaces 28, 30 exhibit significantly enhanced adhesive strength for holding thereon the contact lens 34 and the excess polymerized product 36, respectively, by simple and economical UV-treatment operation as described above. Accordingly, the intended contact lens 34 can be formed with high production efficiency. As mentioned above, the excimer lamp need not be located close to the molding surface 16 of the male mold 10 and the reservoir-defining surface 22 of the female mold 12 during the UV-treatment operation for forming the UV-treated surface 28, 30, avoiding a risk of damaging the male and female molds 10, 12 due to possible contact with the excimer lamp.

In the present embodiment, the molded contact lens 34 is held on the male mold 10 such that the contact lens 34 adheres to the molding surface 16 of the male mold 10, which molding surface 16 provides an outer surface of the downwardly protruding convex bottom portion 14 of the male mold 10. According to this arrangement, the contact lens 34 can be easily removed from the UV-treated surface 28 without being damaged, by collapsing the male mold 10, e.g., by simply pressing the cylindrical portion of the male mold 10 radially inwardly.

In the present embodiment, the peripheral zone-defining surface 19 of the molding surface 16 of the male mold 10, which peripheral zone-defining surface 19 gives the peripheral zone except for the optical zone in the back surface of the intended contact lens 34, is formed into the UV-treated surface 28 to which the formed contact lens 34 adheres. In this arrangement, the molded contact lens 34 is held on the male mold 10 such that the contact lens 34 adheres only at its peripheral zone to the UV-treated surface 28 when the two molds 10, 12 are separated away from each other. Accordingly, the optical zone of the contact lens 34 is effectively prevented from being damaged, so that the contact lens is capable of exhibiting desired optical characteristics.

In the illustrated embodiment, the entirety of the reservoir-defining surface 22 of the female mold 12 is formed into the UV-treated surface 30, so that the excess polymerized product 36 formed in the reservoir 26 is held on the female mold 12 such that the excess polymerized product 36 adheres to the UV-treated surface 30. Accordingly, the excess polymerized product 36 remains in the semi-spherical portion 18 of the female mold 12 when the two molds 10, 12 are separated away from each other. In this arrangement, the contact lens 34 as the intended ophthalmic article is held on the male mold 10 while the excess polymerized product 36 to be discarded is held on the female mold 12, every time when the two molds 10, 12 are separated away from each other, resulting in significantly enhanced production efficiency of the contact lens 34.

EXAMPLES

To further clarify the concept of the present invention, some examples of the invention will be described. It is to be understood that the present invention is not limited to the details of the illustrated examples, but may be embodied with various changes, modifications and improvements, which may occur to those skilled in the art without departing from the scope of the invention defined in the attached claims.

Example 1

Initially, six pairs of the mold assemblies having a structure similar to that of the mold assembly shown in FIG. 1 were prepared. Namely, six male molds 10 shown in FIG. 2 and six female molds 12 shown in FIG. 3 were produced by molding or cutting operation known in the art. These molds are resin molds formed of polypropylene. Then, there was prepared a dielectric barrier discharge excimer lamp which is filled with a Xe gas and which emits a UV radiation having a principal wavelength of 172 nm. To each of the six male molds 10 prepared as described above, the UV radiation emitted from the excimer lamp was applied at the irradiance as indicated in the following Table 1 for the predetermined time period also indicated in Table 1. Described in detail, each male mold 10 was irradiated with the UV radiation such that the outer surface of the convex bottom portion 14, i.e., the entirety of the molding surface 16, and the outer circumferential surface 21 of the cylindrical portion, i.e., the entirety of the reservoir-defining surface 21 which cooperates with the reservoir-defining surface 22 of the female mold 12 to define the reservoir 26, were exposed directly to UV radiation emitted from the excimer lamp, so that these surfaces 16, 21 of the male mold 10 were formed into the UV-treated surfaces. These six pairs of the mold assemblies each including the male mold prepared as described above are indicated as Nos. 1 through 6 in Table 1.

TABLE 1

| mold assembly No. | irradiance (mW/cm$^2$) | radiation time |
|---|---|---|
| 1 | 0.3 | 1 |
| 2 | 0.3 | 5 |
| 3 | 0.3 | 10 |
| 4 | 0.3 | 20 |
| 5 | 0.3 | 60 |
| 6 | 7.3 | 60 |

Five soft contact lenses were formed according to a known molding method by using each of the mold assemblies Nos. 1–6 wherein the respective molding surfaces 16 and the respective outer circumferential surfaces 21 of the cylindrical portions of the male molds 10 were UV-treated under different conditions in which the irradiance or the radiation time was different from each other. Similarly, five soft contact lenses were formed by the known molding method by using a comparative mold assembly No. 1. Unlike the male molds of the mold assemblies Nos. 1–6, the male mold 10 of this comparative mold assembly No. 1 was not UV-treated at its molding surface 16 and the reservoir-defining surface 21. For each of the mold assemblies Nos. 1–6 according to the present invention and the comparative mold assembly No. 1, the number of the contact lenses adhering to and remaining on the male mold 10 and the number of the contact lenses adhering remaining on the female molds 12 were checked when the male and female molds were separated away from each other. Further, it was examined whether or not each soft contact lens could be removed from the mold on which the contact lens was held, by collapsing the corresponding mold. The results are indicated in the following Table 2.

TABLE 2

| | mold assembly No. | number of contact lenses adhering to the male mold | number of contact lenses adhering to the female mold | removal from the male or female mold by collapsing |
|---|---|---|---|---|
| Present invention | 1 | 5 | 0 | possible |
| | 2 | 5 | 0 | possible |
| | 3 | 5 | 0 | possible |
| | 4 | 5 | 0 | impossible |
| | 5 | 5 | 0 | impossible |
| | 6 | 5 | 0 | impossible |
| Comparative example | 1 | 2 | 3 | possible |

As is parent from the results indicated in the Table 2, all of the five contact lenses adhered to and were held on the male mold in each of the mold assemblies Nos. 1–6 of the present invention when the male and female molds 10, 12 were separated away from each other. In contrast, two of the five contact lenses adhered to the male mold 10 while the rest (three) adhered to the female mold in the comparative mold assembly No. 1. The results indicate that it is difficult to expect to which one of the male and female molds 10, 12 the molded contact lens will adhere in the conventional mold assembly. In contrast, the molded contact lens adhered to and were held on the male mold 10 in each of the mold assemblies Nos. 1–6 according to the present invention with high reliability every time when the male and female molds 10, 12 are separated away from each other.

Example 2

A mold assembly shown in FIG. 1 was prepared in a manner similar to that in the above Example 1. Further, there was prepared the excimer lamp as used in the Example 1, and a UV-shielding PET film. After a rectangular hole having a size of 4 mm$^2$ was formed in the PET film, the PET film was positioned over the male mold 10 such that the rectangular hole formed in the PET film was located over a portion of the peripheral zone-defining surface 19 of the molding surface 16, so that only that portion of the peripheral zone-defining surface 19 was arranged to be exposed to UV radiation transmitted through the rectangular hole of the PET film. Thereafter, the male mold 10 was irradiated with the UV radiation emitted from the excimer lamp at the irradiance of 0.3 mW/cm$^2$ for ten seconds, so that only the above-indicated portion of the peripheral zone-defining surface 19 was treated with UV radiation.

By using this mold assembly (No. 7) whose male mold 10 was UV-treated at the portion of the peripheral zone-defining surface 19 of the molding surface 16 as described above, five soft contact lenses were molded in a manner similar to that in the above Example 1. The numbers of the soft contact lenses adhering to and remaining on the male mold 10 and female mold 12, respectively, were checked when the two molds were separated away from each other. Further it was tested whether or not each contact lens could be removed from the mold on which the lens was held, by collapsing the corresponding mold. In the present mold assembly No. 7, all of the five soft contact lenses were held on the male molds 10 and could be removed from the corresponding male molds 10 without any trouble by collapsing the male molds 10. Each of the separated contact lenses was visually inspected whether or not its back surface suffered from any damage or flaw. The visual inspection revealed that none of the contact lenses suffered from any damage or flaw at the optical zone of each back surface.

It was confirmed that the molded soft contact lens could be securely held on the male mold 10 such that the contact lens adhered to the molding surface 16 even when only a portion of the molding surface 16 of the male mold 10 was w-treated. It was also confirmed that the optical zone in the back surface of the soft contact lens was prevented from being damaged since the optical zone of the contact lens did not adhere to the molding surface 16 when only the peripheral zone-defining surface 19 of the molding surface 16 was UV-treated, which peripheral zone-defining surface 19 gives the peripheral zone except for the optical zone of the contact lens.

Example 3

Initially, there were prepared the mold assembly No. 7 as used in the above Example 2, and the excimer lamp as used in the above Examples 1 and 2. The female mold 12 of this mold assembly was irradiated with UV radiation emitted from the excimer lamp such that the entirety of the reservoir-defining surface 22 was UV-treated. Thus, there was prepared a mold assembly No. 8 consisting of the male mold 10 whose molding surface 16 was partially UV-treated and the female mold 12 whose reservoir-defining surface 22 was entirely UV-treated. As in the above Example 2, the reservoir-defining surface 22 of the female mold 12 was UV-treated at the irradiance of 0.3 mW/cm² for ten seconds.

In addition, there were prepared the mold assembly No. 3 as used in the Example 3, wherein the molding surface 16 and the reservoir-defining surface 21, which cooperates with the reservoir-defining surface 22 of the female mold 12 to define the reservoir 26, were UV-treated, and the comparative mold assembly No. 1 as used in the Examples 1 and 2 wherein either of the male and female molds 10, 12 was not UV-treated.

By using each of the mold assemblies Nos. 8 and 3 according to the present invention and the comparative mold assembly No. 1, five soft contact lenses were molded in a manner similar to that in the Example 1. For each mold assembly, the numbers of the soft contact lenses adhering to the male mold and female mold, respectively, were checked when the two molds were separated away from each other. Further, in each mold assembly, it was checked the numbers of the excess polymerized products 36 adhering to the male mold 10 and the female mold 12, respectively, when the two molds 10, 12 were separated away from each other. The results are indicated in the following Table 3.

assembly No. 1 wherein none of the male mold 10 and the female mold 12 was UV-treated.

Accordingly, it is recognized that the excess polymerized product 36 formed in the reservoir 26 adheres to and is held on the specific one of the male and female molds 10, 12, which has the UV-treated reservoir-defining surface 21 or 22, irrespective whether the male mold 10 or the female mold 12 holds the molded soft contact lens thereon.

Example 4

Three pairs of the mold assemblies having a structure similar to that of the mold assembly shown in FIG. 1 and the excimer lamp as used in the above Example 1 were prepared. The thus prepared mold assemblies were irradiated with UV radiation at different degrees of irradiance for different time periods shown in the following Table 4, so that the entirety of the molding surface 16 and the reservoir-defining surface 21 of the male mold 10 of each mold assembly were exposed to UV radiation energy per unit area of 0.05 mJ/cm², 0.1 mJ/cm², or 0.2 mJ/cm².

In a known molding method similar to that in the Example 1, five soft contact lenses were formed by using each mold assembly whose male mold was UV-treated at its molding surface 16 and the reservoir-defining surface 21 as described above. Thereafter, for each mold assembly, the numbers of the soft contact lenses adhering to and remaining on the male mold 10 and the female mold 12, respectively, were checked when the two molds 10, 12 were separated away from each other. It was further checked whether or not the soft contact

TABLE 3

|  | mold assembly NO. | number of contact lenses adhering to the male mold | number of contact lenses adhering to the female mold | number of excess polymerized products adhering to the male mold | number of excess polymerized products adhering to the female mold |
|---|---|---|---|---|---|
| Present invention | 3 | 5 | 0 | 5 | 0 |
|  | 8 | 5 | 0 | 0 | 5 |
| Comparative example | 1 | 2 | 3 | 0 | 5 |

As is apparent from the results indicated in the above Table 3, all of five excess polymerized products 36 adhered to and were held on the male mold 10 in the mold assembly No. 3 wherein the entirety of the molding surface 16 and the entirety of the reservoir-defining surface 21 of the male mold 10 were UV-treated while the female mold 12 was not UV-treated. In contrast, all on the five excess polymerized products 36 adhered to and were held on the female mold 12 in the mold assembly No. 8 according to the present invention wherein a portion of the molding surface 16 of the male mold and the reservoir-defining surface 22 of the female mold 12 were UV-treated, and in the comparative mold lens could be removed from the mold on which the contact lens was held, by collapsing the corresponding mold. The results are indicated in the following Table 4. The Table 4 also shows the data obtained for the mold assemblies Nos. 1–6 and the comparative mold assembly No. 1 of the Example 1, which data include the irradiance, radiation time, radiation energy calculated based on the irradiance and the radiation time, numbers of the soft contact lenses adhering to the male mold and the female mold, respectively, and whether or not the soft contact lens was easily removed from the mold on which it was held, by collapsing the corresponding mold.

TABLE 4

| UV radiation energy (mJ/cm²) | irradiance (mW/cm²) | radiation time (sec.) | number of contact lenses adhering to the male mold | number of contact lenses adhering to the female mold | removal from the male or female mold by collapsing |
|---|---|---|---|---|---|
| — | — | — | 2 | 3 | possible |
| 0.05 | 0.05 | 1 | 3 | 2 | possible |
| 0.1 | 0.1 | 1 | 5 | 0 | possible |
| 0.2 | 0.2 | 1 | 5 | 0 | possible |
| 0.3 | 0.3 | 1 | 5 | 0 | possible |

TABLE 4-continued

| UV radiation energy (mJ/cm$^2$) | irradiance (mW/cm$^2$) | radiation time (sec.) | number of contact lenses adhering to the male mold | number of contact lenses adhering to the female mold | removal from the male or female mold by collapsing |
|---|---|---|---|---|---|
| 1.5 | 0.3 | 5 | 5 | 0 | possible |
| 3.0 | 0.3 | 10 | 5 | 0 | possible |
| 6.0 | 0.3 | 20 | 5 | 0 | impossible |
| 18 | 0.3 | 60 | 5 | 0 | impossible |
| 438 | 7.3 | 60 | 5 | 0 | impossible |

As is apparent from the results indicated in Table 4, the number of the soft contact lenses adhering to the male mold increases with an increase of the UV radiation energy acting on the molding surface 16 and the reservoir-defining surface 21 of the male mold 10, from zero to 0.1 mJ/cm$^2$. When the UV radiation energy acting on those surfaces 16, 21 was within a range of 0.1~5.5 mJ/cm$^2$, the molded contact lens adhered to and was held on the male mold. Further, the contact lens could be easily removed from the male mold on which the contact lens was held, by collapsing the corresponding male mold.

Example 5

Four pairs of the mold assemblies having a structure similar to that of the mold assembly shown in FIG. 1 were prepared in a manner similar to that in the Example 1. As the UV-radiation emitting lamp, the following four lamps having different principal wavelength values were prepared: dielectric barrier discharge excimer lamp (principal wavelength of UV radiation=172 nm); low-pressure mercury lamp (principal wavelength of UV radiation=185 nm and 254 nm) high-pressure mercury lamp (principal wavelength of UV radiation=1365 nm) and black-light lamp (principal wavelength of UV radiation=365 nm).

The four mold assemblies were irradiated with UV radiation emitted from the respective four lamps, such that the molding surface 16 and the reservoir-defining surface 21 of the male mold of each mold assembly were exposed directly to UV radiation, as in the Example 1. The irradiance and the radiation time are indicated in the following Table 5. By using each mold assembly, five soft contact lenses were molded according to a known molding method.

As in the Example 1, the numbers of the soft contact lenses adhering to the male mold 10 and the female mold 12, respectively, were checked for each mold assembly when the two molds 10, 12 were separated away from each other. The results are also indicated in Table 5.

as the UV-radiation emitting lamp, the excimer lamp and the low-pressure mercury lamp which emit UV radiation having a wavelength of 170~260 nm.

In the illustrated embodiment and Examples 1–5, there have been described the mold assembly which is designed for forming a soft contact lens and the method of producing a soft contact lens using the mold assembly. It is, however, to be understood that the principle of the present invention is equally applicable to a mold assembly for forming an ophthalmic lens such as a hard contact lens or an intraocular lens, or an intermediate product for the ophthalmic lens, and a method of forming the intermediate product. When the principle of the present invention is applied to the mold assembly for forming the intermediate product for the ophthalmic lens and the method of forming the intermediate product for the ophthalmic lens using the mold assembly, the intermediate product is held on one of the first and second molds such that one of its opposite surfaces, which has a profile following that of the corresponding one of the front and back surfaces of the intended ophthalmic lens, adheres to the above-indicated one mold. Thereafter, the other surface of the molded intermediate product is cut to form the other of the front and back surfaces of the intended ophthalmic lens, with the above-indicated one surface of the intermediate product adhering to and remaining on the above-indicated one of the first and second molds, resulting in efficient production of the intended ophthalmic lens.

What is claimed is:

1. A mold assembly for forming an ophthalmic lens article, said mold assembly, comprising a first mold and a second mold, said first and second molds being assembled together to define a mold cavity therebetween having a profile corresponding to that of said ophthalmic lens article, said mold cavity being filled with a polymeric material which is polymerized to form said ophthalmic lens article, wherein at least one of said first and second molds is a resin mold formed from a resin material, a portion of at

TABLE 5

| UV-radiation emitting lamp | principal wavelength of UV-radiation (nm) | irradiance (mW/cm$^2$) | radiation time (min.) | number of contact lenses adhering to the male mold | number of contact lenses adhering to the female mold |
|---|---|---|---|---|---|
| excimer lamp | 172 | 7.3 | 10 | 5 | 0 |
| low-pressure mercury lamp | 185, 254 | 7.3 | 10 | 5 | 0 |
| high-pressure mercury lamp | 365 | 7.3 | 10 | 1 | 4 |
| black-light lamp | 365 | 2.0 | 10 | 2 | 3 |

It is apparent from the results indicated in Table 5 that the molded soft contact lenses always adhered to and were held on the male mold 10 which has been UV-treated by using, least a molding surface of said resin mold is irradiated directly with UV radiation at a wavelength within a range of 170–260 nm to provide a UV-treated surface, wherein said ophthalmic lens article is formed in said mold cavity and is held on said resin mold such that said ophthalmic lens article adheres to said UV-treated surface upon separation of said first and second molds from one another.

2. A mold assembly according to claim 1 wherein only said molding surface of said resin mold is at least partially formed into said UV-treated surface.

3. A mold assembly according to claim 2, wherein said molding surface of said resin mold includes an optical zone-defining region and a peripheral zone-defining region which provide an optical zone and a peripheral zone of said ophthalmic lens article, respectively, and at least a portion of said peripheral zone-defining region is formed into said UV-treated surface.

4. A mold assembly according to claim 1, wherein said first and second molds are formed from a resin material, said first and second molds being assembled together to define therebetween a reservoir for storing an excess of said polymeric material which overflows from said mold cavity, said reservoir being partially defined by a reservoir-defining surface of one of said first and second molds, said one mold being different from the other mold having a molding surface that is at least partially formed into said UV-treated surface, and only said reservoir-defining surface of said one mold being at least partially formed into a UV-treated surface which has been irradiated directly with UV radiation, wherein excess polymerized product formed by polymerization of said excess polymeric material overflowing into said reservoir is held on said reservoir-defining surface of said one mold such that said excess polymerized product adheres to said UV-treated surface of said one mold upon separation of said first and second molds from one another.

5. A mold assembly according to claim 1, wherein said first and second molds are irradiated with said UV radiation with a portion of at least one of said first and second molds being covered with a shielding member which shields said covered portion from said UV radiation, and another unshielded portion of said at least one of said first and second molds is not covered with said shielding member and is treated with said UV radiation to provide said UV-treated surface.

6. A mold assembly according to claim 1, wherein one of said first and second molds, on which said ophthalmic lens article is held such that said ophthalmic lens article adheres to said UV-treated surface, is a male mold while the other of said first and second molds is a female mold.

7. A mold assembly according to claim 1, wherein said UV-treated surface has been irradiated directly with said UV radiation using an excimer lamp.

8. A mold assembly for forming an ophthalmic lens article, said mold assembly comprising a first mold and a second mold, said first and second molds being assembled together to define a mold cavity therebetween having a profile corresponding to that of said ophthalmic lens article, said mold cavity being filled with a polymeric material which is polymerized to form said ophthalmic lens article, wherein at least one of said first and second molds is a resin mold formed from a resin material, a portion of at least a molding surface of said resin mold is irradiated directly with UV radiation at a radiation energy of 0.1–5.5 mJ/cm$^2$ to provide a UV-treated surface, wherein said ophthalmic lens article is formed in said mold cavity and is held on said resin mold such that said ophthalmic lens article adheres to said UV-treated surface upon separation of said first and second molds from one another.

9. A mold assembly according to claim 8, wherein only said molding surface of said resin mold is at least partially formed into said UV treated surface.

10. A mold assembly according to claim 9, wherein said molding surface of said resin mold includes an optical zone-defining region and a peripheral zone-defining region which provide an optical zone and a peripheral zone of said ophthalmic lens article, respectively, and at least a portion of said peripheral zone-defining region is formed into said UV-treated surface.

11. A mold assembly according to claim 8, wherein said first and second molds are formed from a resin material, said first and second molds being assembled together to define therebetween a reservoir for storing an excess of said polymeric material which overflows from said mold cavity, said reservoir being partially defined by a reservoir-defining surface of one of said first and second molds, said one mold being different from the other mold having a molding surface that is at least partially formed into said UV-treated surface, and only said reservoir-defining surface of said one mold being at least partially formed into a UV-treated surface which has been irradiated directly with UV radiation, wherein excess polymerized product formed by polymerization of said excess polymeric material overflowing into said reservoir is held on said reservoir-defining surface of said one mold such that said excess polymerized product adheres to said UV-treated surface of said one mold upon separation of said first and second molds from one another.

12. A mold assembly according to claim 8, wherein said first and second molds are irradiated with said UV radiation with a portion of at least one of said first and second molds being covered with a shielding member which shields said covered portion from said UV radiation, and another unshielded portion of said at least one of said first and second molds is not covered with said shielding member and is treated with said UV radiation to provide said UV-treated surface.

13. A mold assembly according to claim 8, wherein one of said first and second molds, on which said ophthalmic lens article is held such that said ophthalmic lens article adheres to said UV-treated surface, is a male mold while the other of said first and second molds is a female mold.

14. A mold assembly according to claim 8, wherein said UV-treated surface has been irradiated directly with said UV radiation using an excimer lamp.

* * * * *